(12) United States Patent
Casaletto et al.

(10) Patent No.: US 11,978,040 B2
(45) Date of Patent: May 7, 2024

(54) ENGINE SHARDING FOR DISTRIBUTED ORDER PROCESSING

(71) Applicant: Coinbase Global, Inc., San Francisco, CA (US)

(72) Inventors: Holly Casaletto, San Francisco, CA (US); Hao Su, San Francisco, CA (US); Frank Rodriguez, San Francisco, CA (US)

(73) Assignee: Coinbase Global, Inc., San Francisco, CA (US)

(*) Notice: Subject to any disclaimer, the term of this patent is extended or adjusted under 35 U.S.C. 154(b) by 243 days.

(21) Appl. No.: 17/691,942

(22) Filed: Mar. 10, 2022

(65) Prior Publication Data

US 2023/0289781 A1    Sep. 14, 2023

(51) Int. Cl.
*G06Q 20/36*    (2012.01)

(52) U.S. Cl.
CPC ..... *G06Q 20/3678* (2013.01); *G06Q 2220/00* (2013.01)

(58) Field of Classification Search
CPC .................. G06Q 20/00–425; H04L 9/00–50
See application file for complete search history.

(56) References Cited

U.S. PATENT DOCUMENTS

| 2019/0173854 A1* | 6/2019 | Beck | H04L 67/10 |
| 2019/0332691 A1* | 10/2019 | Beadles | G06Q 20/3829 |
| 2020/0210451 A1* | 7/2020 | Wang | G06Q 20/02 |
| 2020/0258061 A1* | 8/2020 | Beadles | H04L 63/102 |

FOREIGN PATENT DOCUMENTS

WO    2019226099 A1    11/2019

OTHER PUBLICATIONS

District Ox Educational Portal "Ethereum Sharding Explained" https://education.district0x.io/general-topics/understanding-ethereum/ethereum-sharding-explained/ website visited Mar. 10, 2022.
Jul. 26, 2019—PR Newswire "Apollo Becomes First Cryptocurrency to Successfully Implement Database Sharding". https://www.prnewswire.com/news-releases/apollo-becomes-first-cryptocurrency-to-successfully-implement-database-sharding-300891593.html New York.

* cited by examiner

*Primary Examiner* — Ari Shahabi
(74) *Attorney, Agent, or Firm* — Banner & Witcoff, Ltd.

(57) ABSTRACT

Aspects of the disclosure relate to order processing. A computing platform may determine that order processing for a subset of a plurality of trading pairs should be migrated from a source computing platform to a destination computing platform. The destination computing platform may configure itself to process first trading pair, and may enter a proxy mode where orders for the subset of the plurality of trading pairs are routed to the destination computing platform. The destination computing platform may receive and load order processing information corresponding to the subset of the plurality of trading pairs, and may direct the source computing platform to cease processing for the subset of the plurality of trading pairs. The destination computing platform may disable the proxy for the source computing platform, and may receive orders/process for the subset of the plurality of trading pairs.

8 Claims, 8 Drawing Sheets

ENGINE SHARDING FOR DISTRIBUTED ORDER PROCESSING

FIELD

Aspects described herein generally relate to cryptocurrencies and processing of trading orders. More specifically, one or more aspects described herein provide improvements in sharding or otherwise re-balancing processing engines to distribute processing of the trading orders and improve processing efficiency.

BACKGROUND

In some cases, exchange trading systems may use a monolithic engine cluster to process order books for all potential cryptocurrency trading pairs. In some instances, especially as the prevalence and types of cryptocurrencies increases, using a single engine cluster to process all of the trading pairs may result in significant latencies. Accordingly, there may be processing delays and/or inefficiencies in the execution of trading orders, which may further lead to poor customer satisfaction. There remains an ever-present need for an improved method of processing such trading orders.

SUMMARY

Aspects of the disclosure provide effective, efficient, scalable, and convenient technical solutions that address and overcome the technical problems associated with processing trading orders. In accordance with one or more embodiments of the disclosure, a computing platform comprising at least one processor, a communication interface, and memory storing computer-readable instructions may perform a method for migrating trading pairs to a destination computing platform from a source computing platform. For example, the destination computing platform may determine, based on processing load within a sharded trading platform that includes the destination computing platform and the source computing platform, that order processing for a subset of trading pairs of a plurality of trading pairs, which may be exchanges of a first cryptocurrency or fiat currency for a second cryptocurrency or fiat currency, should be migrated from the source computing platform to the destination computing platform, where orders for the subset of trading pairs of the plurality of trading pairs are currently routed to and processed by the source computing platform. Based on the determining that the order processing of the subset of trading pairs of the plurality of trading pairs should be migrated from the source computing platform to the destination computing platform, the destination computing platform may configure itself to process a first trading pair. The destination computing platform may enter a proxy mode, where orders for the subset of trading pairs of the plurality of trading pairs may be routed to the destination computing platform rather than the source computing platform based on the entering the proxy mode. The destination computing platform may send, to the source computing platform, one or more commands configured to cause the source computing platform to enter a single connection mode, which may limit communication of the source computing platform to communication with the destination computing platform, and may cause other communication requests to be rejected. The destination computing platform may receive, from the source computing platform, order processing information corresponding to the subset of trading pairs of the plurality of trading pairs. The destination computing platform may load the order processing information of the subset of trading pairs of the plurality of trading pairs (which may, e.g., be in the form of a network message) into memory. The destination computing platform may direct, after the order processing information of the subset of trading pairs of the plurality of trading pairs is loaded into the memory, the source computing platform to cease processing for the subset of trading pairs of the plurality of trading pairs. The destination computing platform may disable, after directing the source computing platform to cease processing for the subset of the plurality of trading pairs, the proxy for the source computing platform. The destination computing platform may receive, after the order processing information of the subset of the plurality of trading pairs is loaded into memory, and once the source computing platform has ceased processing for the subset of the plurality of trading pairs, orders for the subset of the plurality of trading pairs. The destination computing platform may process the received orders for the subset of the plurality of trading pairs.

In one or more instances, determining that the subset of the plurality of trading pairs should be migrated from the source computing platform to the destination computing platform may include receiving, from an order management system, an indication that the subset of the plurality of trading pairs should be migrated from the source computing platform to the destination computing platform. In one or more instances, determining that the subset of the plurality of trading pairs should be migrated from the source computing platform to the destination computing platform may include identifying, based on a processing load at the source computing platform and a processing load at the destination computing platform that the subset of the plurality of trading pairs should be migrated from the source computing platform to the destination computing platform.

In one or more examples, entering the proxy mode may include publishing, to an engine discovery system, an intent to become a proxy for the source computing platform, and the engine discovery system may configure the destination computing platform as the proxy for the source computing platform. In one or more examples, the engine discovery system may notify one or more client devices and an order entry gateway system that the destination computing platform is configured as the proxy for the source computing platform.

In one or more instances, a portion of orders for the subset of the plurality of trading pairs may be routed from the one or more client devices to the order entry gateway system, and the order entry gateway system may route the portion of the orders for processing. In one or more instances, orders for the subset of the plurality of trading pairs may be routed to the destination computing platform rather than the source computing platform based on the destination computing platform entering the proxy mode.

In one or more examples, receiving the order processing information of the subset of the plurality of trading pairs from the source computing platform may include receiving snapshot information for the subset of the plurality of trading pairs that may enable the destination computing platform to process orders for the subset of the plurality of trading pairs, and receiving the order processing information of the subset of the plurality of trading pairs from the source computing platform may occur after requesting, by the destination computing platform, the order processing information. In one or more examples, the orders for the subset of the plurality of trading pairs may be routed exclusively to the destination computing platform once the proxy for the source computing platform is disabled. In one or more examples, receiving the orders for the subset of the plurality of trading pairs may include receiving, after disabling the proxy mode for the source computing platform, the orders for the subset of the plurality of trading pairs.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to sharding trading engines for distributed processing of trading requests. Currently, exchange trading systems assume that there is a single trading engine cluster. As a result, a leader of this monolithic engine cluster may process all order books. As the number of order books increases, such a monolithic cluster may result in increased latencies in order processing. By sharding the engine cluster horizontally into multiple clusters, each one of them may process a subset of the order books, which may increase trading engine request processing capacities and reduce potential latency increases. In some instances, these cluster shards may be created on demand and used to dynamically rebalance the market among the clusters.

The systems and methods described herein relate to delivering another engine cluster that works as an independent peer to a current cluster. The new cluster may be started with full capacity for any new upcoming products to be added. The number of engine clusters may be arbitrary based on market needs.

The cutover of the market from one cluster to another may be seamless, and may have only minimal associated trading downtime. Accordingly, the disclosure herein provides an alternative to a manual cutover, which may include the steps of: 1) disable trading on products that are to be cut over, 2) send product snapshots from the source cluster to the destination cluster, 3) remove the products from the source cluster, 4) launch the products to the destination cluster, and 5) enable trading on the products in the destination cluster.

These and other features are described in further detail below.

Figure 1:
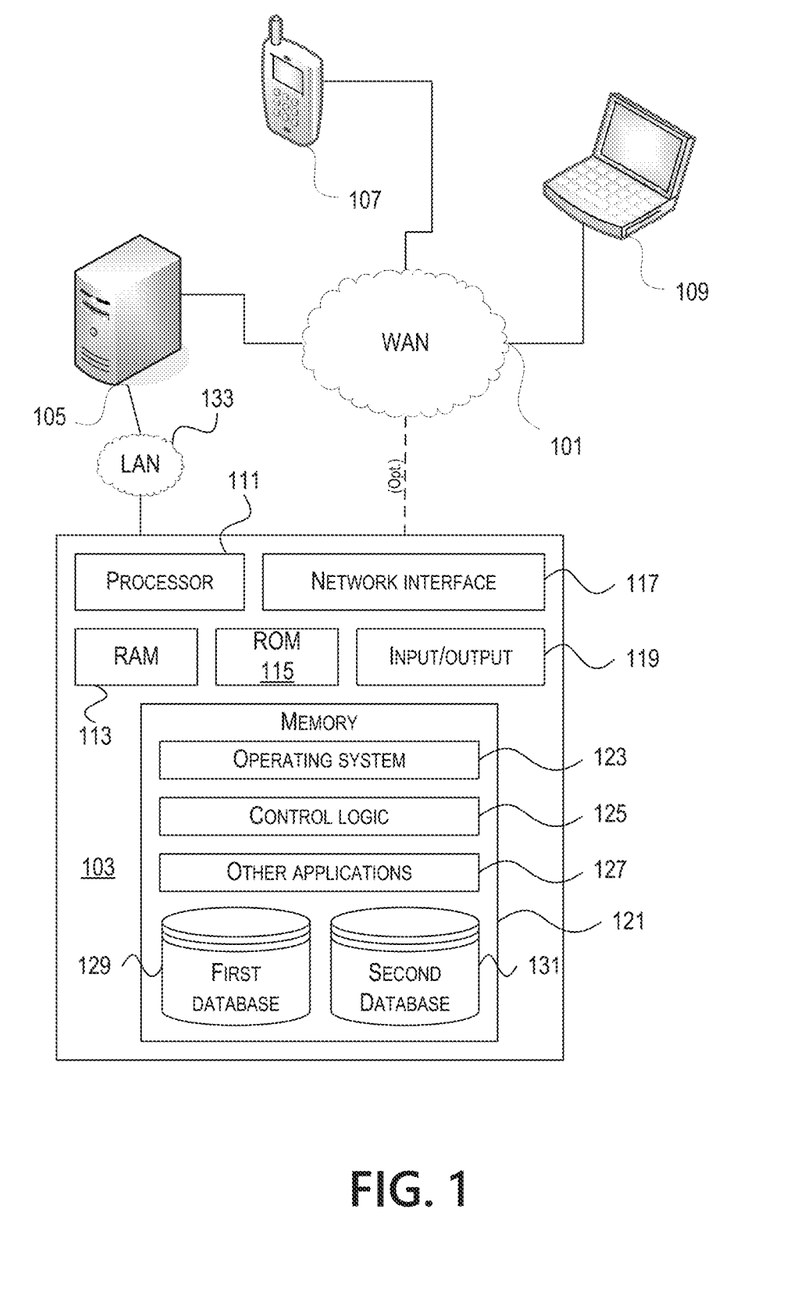
FIG. 1 depicts an illustrative computing environment that implements a method for engine sharding and migrating trading pairs to a destination computing platform from a source computing platform in accordance with one or more example embodiments.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

FIGS. 2A-2E depict an illustrative event sequence for engine sharding and migrating trading pairs to a destination computing platform from a source computing platform in accordance with one or more example embodiments. It should be understood that these figures may depict a group of steps that may be performed in the order as shown in FIGS. 2A-2E (e.g., step 206 shown in FIG. 2B may occur in sequence after step 205 shown in FIG. 2A). This sequence is merely illustrative however, and these steps may be performed in other orders/combinations without departing from the scope of the disclosure.

Figure 2A:
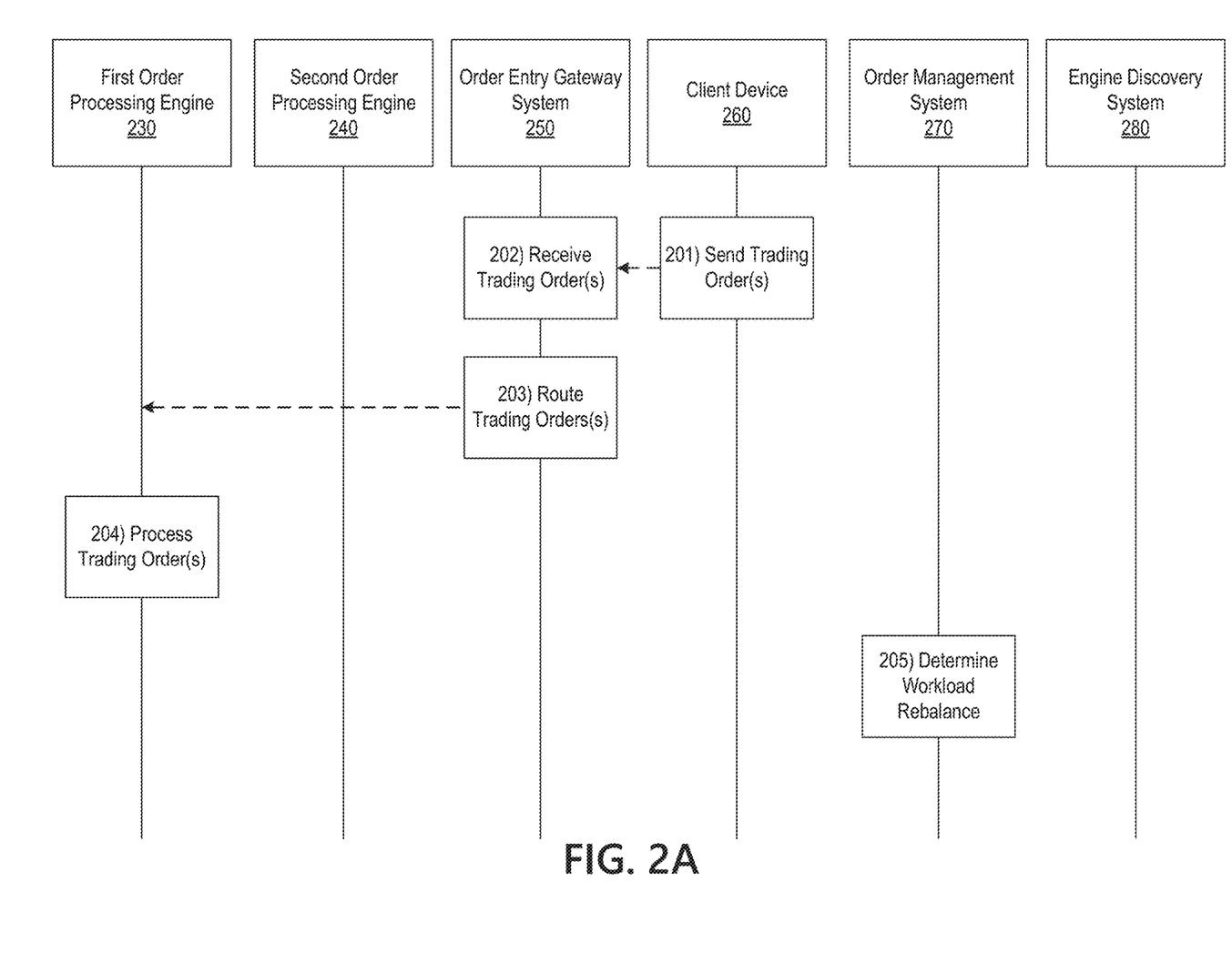
FIGS. 2A-2E depict an illustrative event sequence for performing engine sharding and migrating trading pairs to a destination computing platform from a source computing platform in accordance with one or more example embodiments.

Referring to FIG. 2A, at step 201, a client device 260 (which may be similar, for example, to one or more of devices 105, 107, and/or 109 as illustrated in FIG. 1) may send one or more trading orders to an order entry gateway system 250 (which may be similar, for example, to the data server 103 as illustrated in FIG. 1). For example, the client device 260 may send one or more orders to trade a first amount of a first fiat currency or first cryptocurrency for a second amount of a second fiat currency or a second cryptocurrency (e.g., Bitcoin (BTC)-U.S. Dollars (USD), or the like). In some instances, in addition to or as an alternative to sending the one or more trading orders to the order entry gateway system 250, the client device 260 may send the one or more trading orders to the first order processing engine 230 (which may be similar, for example, to the data server 103 as illustrated in FIG. 1). In some instances, the client device 260 may send the one or more trading orders to the order entry gateway system 250 while a wired or wireless data connection is established with the client device 260.

At step 202, the order entry gateway system 250 may receive the one or more trading orders sent at step 201. For example, the order entry gateway system 250 may receive the one or more trading orders while a wired or wireless data connection is established with the client device 260.

At step 203, the order entry gateway system 250 may route the one or more trading orders, received at step 202 to the first order processing engine 230. For example, the order entry gateway system 250 may include stored correlations between trading pairs and order processing engines configured to process the various trading pairs. In this example, the order entry gateway system 250 may identify that the first order processing engine 230 is configured to process the trading pair corresponding to the one or more trading orders, and may route the one or more trading orders to the first order processing engine 230 accordingly. For example, the order entry gateway system 250 may route the one or more trading orders while a wired or wireless data connection is established with the first order processing engine 230.

Figure 4:
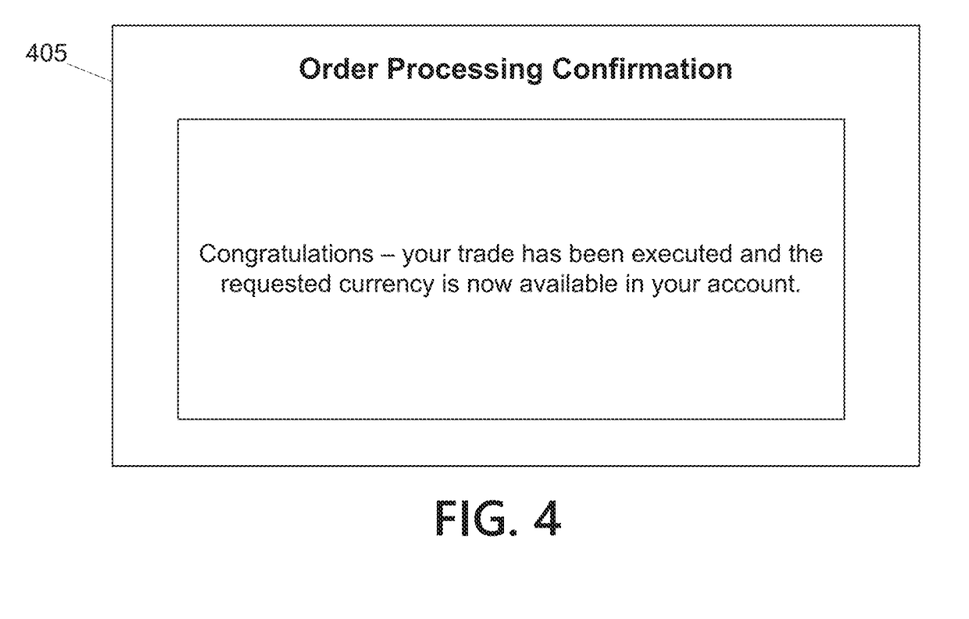
FIG. 4 depicts an illustrative graphical user interface for engine sharding and migrating trading pairs to a destination computing platform from a source computing platform in accordance with one or more example embodiments.

At step 204, the first order processing engine 230 may process the one or more trading orders. For example, the first order processing engine 230 may execute an exchange of the first amount of the first fiat currency or first cryptocurrency for the second amount of the second fiat currency or second cryptocurrency. In these instances, the first order processing engine 230 may send a notification to the client device 260 indicating that the one or more trading orders have been executed (which may, e.g., cause the client device 260 to display a graphical user interface similar to graphical user interface 405, which is displayed in FIG. 4). Additionally or alternatively, the first order processing engine 230 may cause the second amount of the second fiat currency or second cryptocurrency to be moved into an account for a user of the client device 260.

At step 205, the order management system 270 (which may be similar, for example, to the data server 103 as illustrated in FIG. 1) may identify that a workload of the first order processing engine 230 (or a trading platform that includes the first order processing engine 230) should be rebalanced. For example, the order management system 270 may maintain a threshold latency value, number of trades per processing engine, and/or other threshold value, and may detect that the threshold has been exceeded during operation. In instances where the order management system 270 identifies that such a threshold has been exceeded, the order management system 270 may identify that the workload should be rebalanced. Additionally or alternatively, the order management system 270 may receive a message or other notification (e.g., which may be or include user input from an enterprise user device corresponding to the order management system) indicating that the workload should be rebalanced. Accordingly, the order management system 270 may identify that orders for the trading pair previously processed by the first order processing engine 230 should be instead sent to the second order processing engine 240 (which may be similar, for example, to the data server 103 as illustrated in FIG. 1) for processing.

In some instances, in determining that the workload should be rebalanced, the order management system 270 may identify that an existing order processing cluster should be used to process trading requests corresponding to the trading pair and/or that a new processing cluster should be created and subsequently used to process the trading requests. In either of these instances, the newly identified or generated processing cluster may correspond to, be affiliated with, or be otherwise hosted by the second order processing engine 240. For example, such a cluster/processing engine may be implemented or otherwise have workload/trading orders rebalanced to it as described below. In doing so, a trading platform that includes or otherwise corresponds to the first order processing engine 230 and the second order processing engine 240 may provide horizontal scalability of processing clusters/processing engines, which may allow for the continuous creation and/or combination of clusters/processing engines. Accordingly, the order management system 270 may freely move workload between the various clusters/processing engines to improve efficiency and reduce latency. Furthermore, by rebalancing workload among various processing engines/clusters, trading requests may be handled simultaneously rather than constrained by a purely sequential process in which each request is processed in a one after the other fashion.

Although a second order processing engine 240 is described with regard to the event sequence, this is for illustrative purposes only, and any number of processing engines/clusters may be implemented without departing from the methods described herein.

Figure 2B:
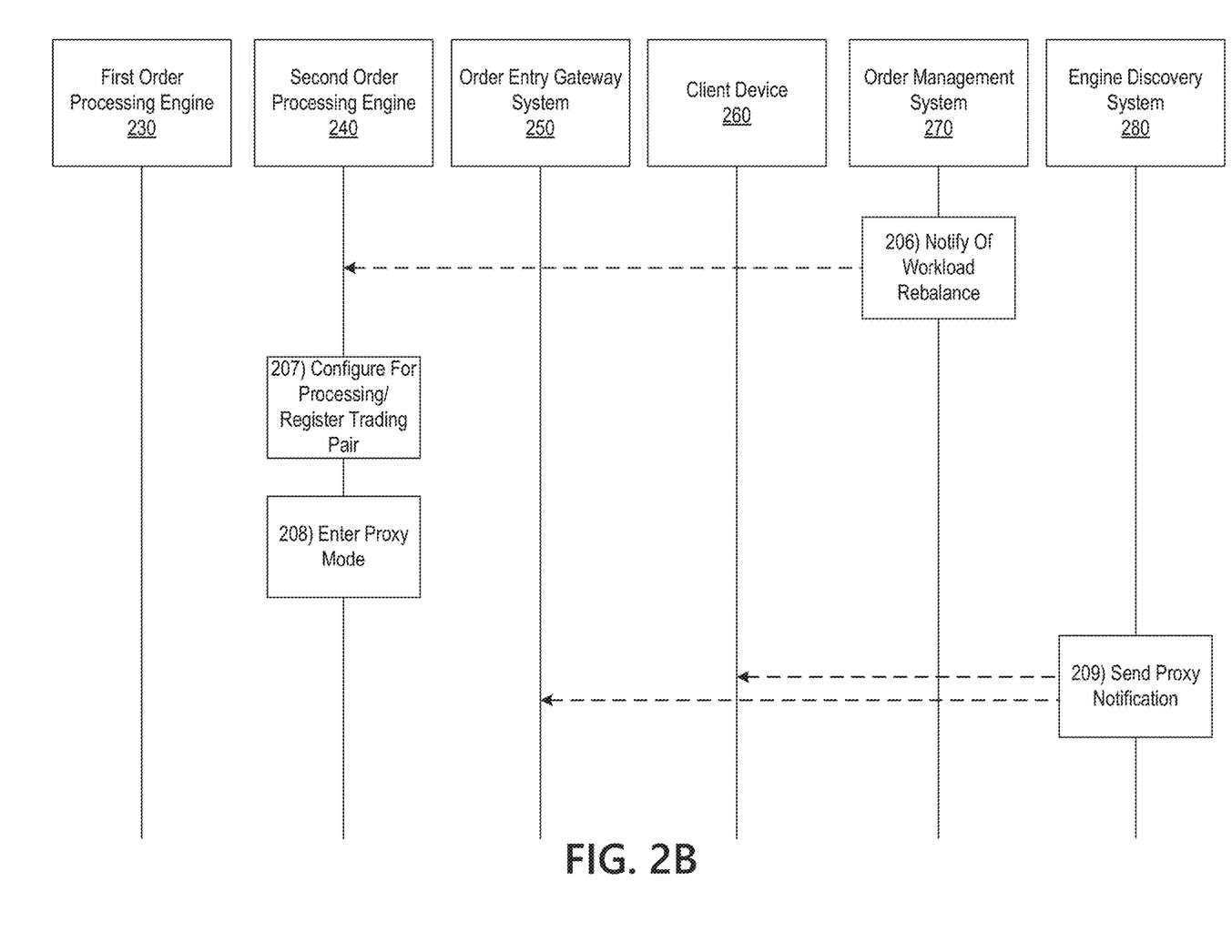

Referring to FIG. 2B, at step 206, the order management system 270 may notify the second order processing engine 240 of the workload rebalance determined at step 206. In doing so, the order management system 270 may cause the second order processing engine 240 to initiate configuration of itself to process the trading pair. For example, the first order processing engine 230 and the second order processing engine 240 may be part of a sharded trading platform, and the second order processing engine 240 may determine, based on processing load within the sharded trading platform and/or user input (either of which may, e.g., be sent from the order management system 270 by way of notifying the second order processing engine 240 of the workload rebalance), that order processing for the trading pair (which may, e.g., be one of a plurality of trading pairs processed by the sharded trading platform) should be migrated from the first order processing engine 230, where they may currently be being processed, to the second order processing engine 240.

At step 207, based on or in response to the notification of the workload rebalance sent at step 206 and indicating that order processing for the trading pair should be migrated from the first order processing engine 230 to the second order processing engine 240, the second order processing engine 240 may configure itself to process trading orders involving the trading pair. For example, the second order processing engine 240 may register the trading pair, which may involve storing information at the second order processing engine 240 that may enable the second order processing engine 240 to process such trading orders.

At step 208, the second order processing engine 240 may enter proxy mode. In some instances, the second order processing engine 240 may enter the proxy mode after configuring itself to process trading orders involving the trading pair at step 207. In doing so, the second order processing engine 240 may configure itself to receive trading requests for the trading pair, rather than having such requests routed to the first order processing engine 230. For example, once the second order processing engine 240 has entered the proxy mode, orders for the trading pair may be routed to the second order processing engine 240 rather than the first order processing engine 230. In some instances, to enter the proxy mode, the second order processing engine 240 may publish, to the engine discovery system 280, an intent to become a proxy for the first order processing engine 230. In these instances, based on or in response to the expressed proxy intent, the engine discovery system 280 may configure the second order processing engine 240 as a proxy for the first order processing engine 230 accordingly. Once the second order processing engine 240 has entered proxy mode, it may notify the engine discovery system 280 (e.g., via a wired or wireless data connection established with the engine discovery system 280) (which may be similar, for example, to the data server 103 as illustrated in FIG. 1). By configuring the second order processing engine 240 as a proxy, the one or more trading orders, already in queue for processing by the first order processing engine 230, may be executed or otherwise processed, while the one or more additional trading orders (e.g., received after the workload rebalance determination) may begin to be routed through the second order processing engine 240 to the first order processing engine 230 for processing. In doing so, situations in which the first order processing engine 230 receives trading requests for trading pairs once the workload for such trading pairs has been transitioned to the second order processing engine 240 may be avoided, which may e.g., prevent the missed execution of these orders by first order processing engine 230. In some examples, requests associated with the trading pair may only be routed to the second order processing engine 240 when in proxy mode (e.g., a temporary step for transitioning the workload).

At step 209, the engine discovery system 280 (which may be similar or have similar components, for example, to the data server 103 as illustrated in FIG. 1) may send a proxy notification to the client device 260 and/or the order entry gateway system 250 (e.g., while a wired or wireless data connection is established between the order entry gateway system 250 and/or the client device 260) indicating that the second order processing engine 240 is configured as a proxy for the first order processing engine 230. For example, the engine discovery system 280 may periodically provide a source of truth to any connected client devices (such as client device 260, order entry gateway system 250, and/or other devices) which may sync the client devices and/or the order entry gateway system 250 to communicate with the second order processing engine 240 to fulfill trading orders for the trading pair. In doing so, the engine discovery system 280 may inform the client devices of the destination for their requests, but the fact that order processing for the trading pair is shifting to a new processing engine may be otherwise unnoticed by the client devices.

Figure 2C:
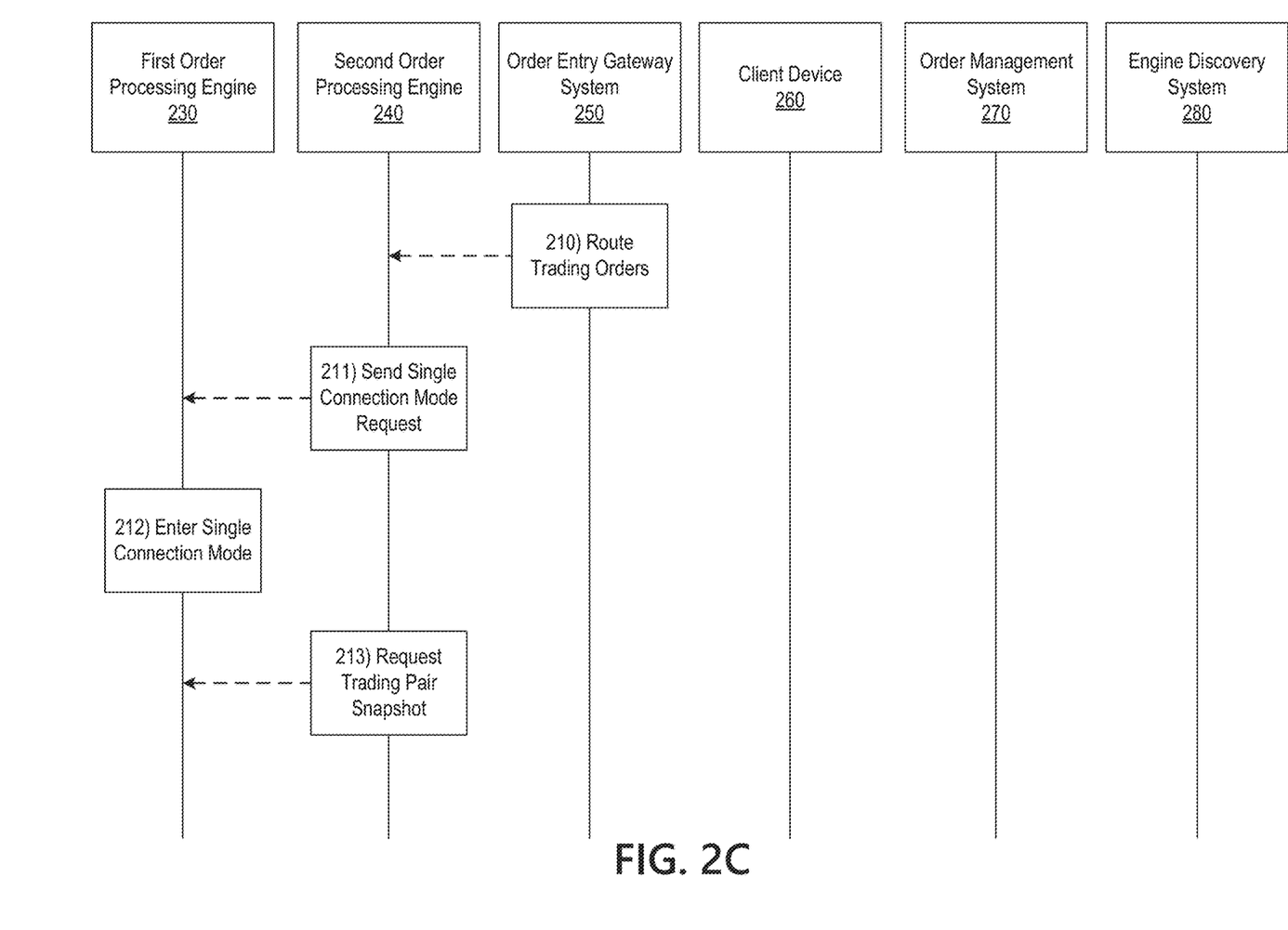

Referring to FIG. 2C, at step 210, the order entry gateway system 250 may receive one or more additional trading orders from client devices (such as the client device 260) and may route the one or more additional trading orders to the second order processing engine 240 accordingly. For example, the client devices may receive orders via a browser interface, and the browser may be configured to connect to the order entry gateway system 250 to provide the one or more additional trading orders. For example, the order entry gateway system 250 may identify that the second order processing engine 240 is configured as a proxy for the first order processing engine 230, and that based on the proxy configuration, orders for the trading pair should be sent to the second order processing engine 240 accordingly. In some instances, as the one or more additional trading orders are received and routed to the second order processing engine 240, the first order processing engine 230 may continue to process any remaining trading orders of the one or more trading orders, received by the first order processing engine 230 prior to the workload rebalance and routed to the first order processing engine 230 through the second order processing engine 240. For example, the first order processing engine 230 may continue to process any existing orders of the one or more trading orders. In doing so, the first order processing engine 230 and the second order processing engine 240 may perform seamless processing of trading orders, without interrupting execution of these trades (e.g., without downtime).

At step 211, the second order processing engine 240 may send a request to the first order processing engine 230 for the first order processing engine 230 to enter single connection mode. For example, the second order processing engine 240 may send the single connection mode request to the first order processing engine 230 while a wired or wireless data connection is established with the first order processing engine. In some instances, the request may include one or more commands configured to cause the first order processing engine 230 to enter the single connection mode (which may, e.g., cause the first order processing engine 230 to enter the single connection mode once received).

At step 212, based on the request from the second order processing engine 240 to enter the single connection mode, the first order processing engine 230 may enter the single connection mode accordingly. In entering the single connection mode, the first order processing engine 230 may limit its communication to exclusively communication with the second order processing engine 240 (e.g., for routing or otherwise communicating any existing trading orders for the trading pair), and therefore causing other communication requests (e.g., trading order requests from various client devices) to be rejected. For example, the first order processing engine 230 may process only trading orders received from the second order processing engine 240 (e.g., by way of the proxy and single connection modes) until the second order processing engine 240 is fully configured.

At step 213, the second order processing engine 240 may request, from the first order processing engine 230, snapshot information for the trading pair that may enable the second order processing engine 240 to process the requests corresponding to the trading pair. For example, in requesting the snapshot information, the second order processing engine 240 may request order processing information corresponding to the trading pair that may configure the second order processing engine 240 to be able to start processing trading requests once the first order processing engine 230 has stopped such processing. In some instances, this may include details about the unfulfilled orders, and/or other information about the trading pair. In some instances, the second order processing engine 240 may send the request for snapshot information while a wired or wireless data connection is established with the first order processing engine 230.

Figure 2D:
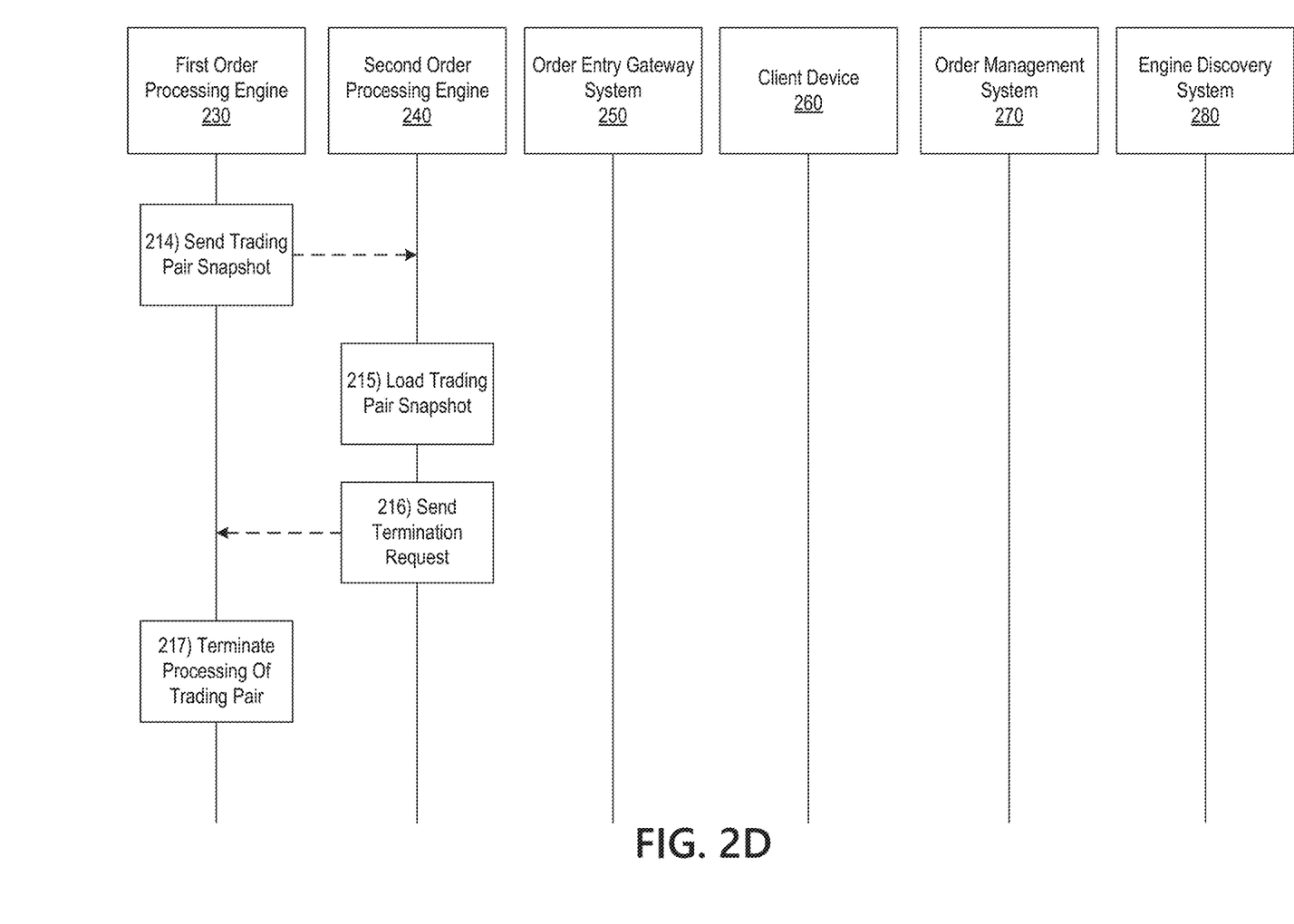

Referring to FIG. 2D, at step 214, based on or after the request for the trading pair snapshot information is sent from the second order processing engine 240, the first order processing engine 230 may send the trading pair snapshot information to the second order processing engine 240 (e.g., while a wired or wireless data connection is established with the second order processing engine 240).

At step 215, the second order processing engine 240 may load the trading pair snapshot information into memory.

At step 216, the second order processing engine 240 may send a termination request to the first order processing engine 230, requesting that the first order processing engine 230 terminates processing of trading requests for the trading pair. In some instances, the second order processing engine 240 may send the termination request to the first order processing engine 230 once the trading pair snapshot information has been loaded into memory (e.g., at step 215). For example, once the trading pair snapshot information has been loaded into memory, the second order processing engine 240 may be configured to process trading requests for the trading pair, and thus may begin to exclusively process the trading requests for the trading pair. In some instances, the second order processing engine 240 may send the termination request to the first order processing engine 230 while a wired or wireless data connection is established with the first order processing engine 230.

At step 217, based on or in response to the termination request from the second order processing engine 240, the first order processing engine 230 may terminate processing of trading requests for the trading pair. This may prevent trading of a particular trading pair from being live in multiple different processing engines.

Figure 2E:
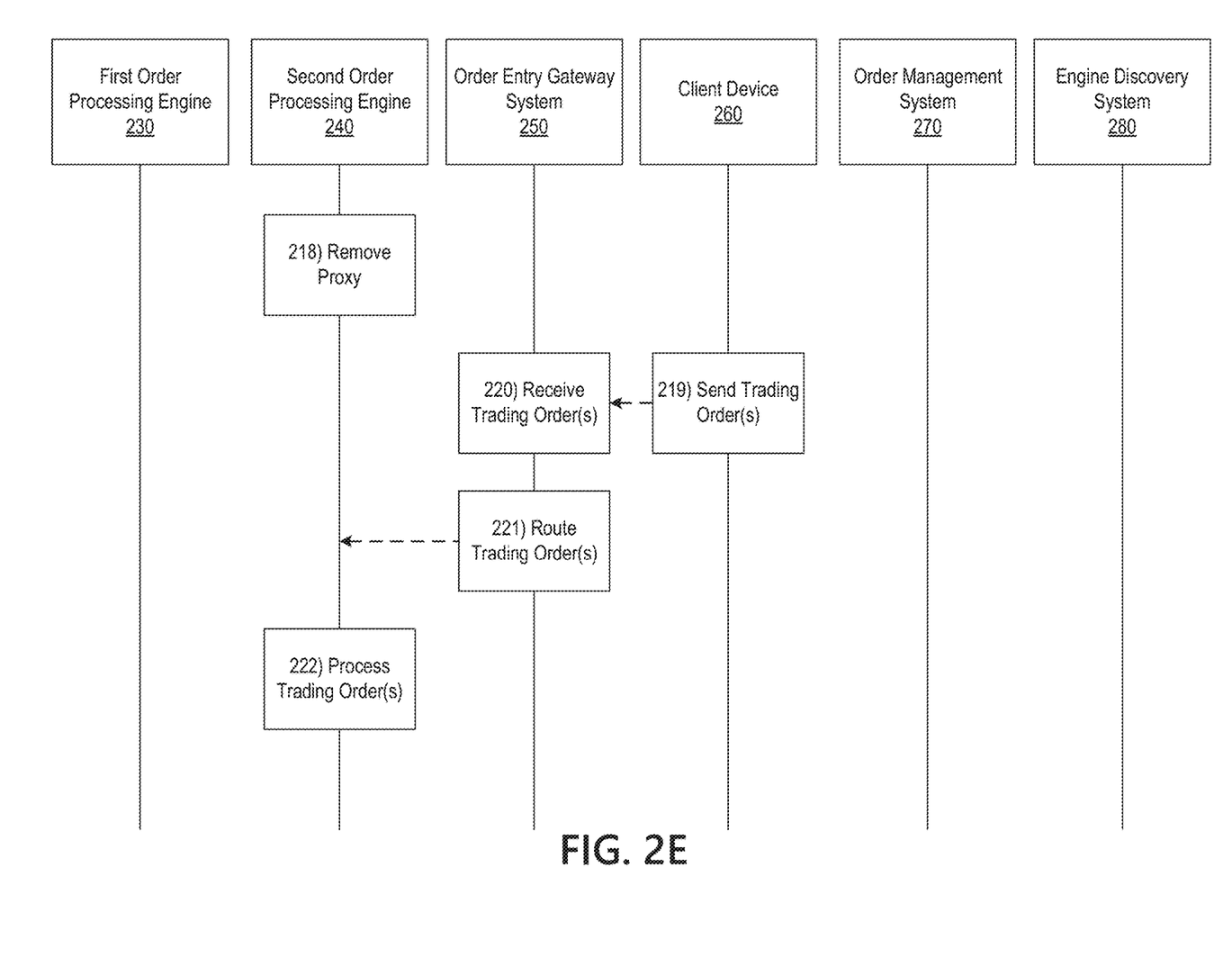

Referring to FIG. 2E, at step 218, the second order processing engine 240 may remove the proxy. For example, once the first order processing engine 230 has terminated processing of trading requests for the trading pair, the second order processing engine 240 may disable the proxy. For example, because no trading requests for the trading pair are being sent to or otherwise routed to the first order processing engine 230 at this point, and rather because all trading requests for the trading pair are being sent to or otherwise routed to the second order processing engine 240, the second order processing engine 240 may have no need to operate with a proxy. Accordingly, the second order processing engine 240 may now be the sole order processing engine for requests associated with the trading pair, thereby freeing up (or making available) the first order processing engine 230 for use in processing requests associated with other trading pairs (which may, e.g., increase overall efficiency of the trading system that includes the first order processing engine 230 and the second order processing engine 240, and may reduce latencies/delays associated with processing these trading pairs accordingly).

At step 219, the client device 260 (or other client devices) may send one or more new trading orders to the order entry gateway system 250. For example, the client device 260 may send one or more new trading orders, corresponding to the trading pair, to the order entry gateway system 250. For example, the client device 260 may request to trade a third amount of the first fiat currency or first cryptocurrency for a fourth amount of the second fiat currency or second cryptocurrency.

For example, the client device 260 may send the one or more new trading orders to the order entry gateway system 250 while a wired or wireless data connection is established with the order entry gateway system 250.

At step 220, the order entry gateway system 250 may receive the one or more new trading orders sent at step 219. For example, the order entry gateway system 250 may receive the one or more new trading orders while a wired or wireless data connection is established with the client device 260.

At step 221, the order entry gateway system 250 may route the one or more new trading orders exclusively to the second order processing engine 240. For example, the order entry gateway system 250 may route the one or more new trading orders to the second order processing engine 240 while a wired or wireless data connection is established with the second order processing engine 240. In some instances, the second order processing engine 240 may receive the one or more new trading orders after the trading pair snapshot information has been loaded into memory, once the first order processing engine 230 has ceased processing for the trading pair, and once the second order processing engine 240 has disabled the proxy mode.

At step 222, the second order processing engine 240 may process the one or more new trading orders. For example, the second order processing engine 240 may execute an exchange of the third amount of the first fiat currency or first cryptocurrency for the fourth amount of the second fiat currency or second cryptocurrency. In these instances, the second order processing engine 240 may send a notification to the client device 260 indicating that the one or more new trading orders have been executed (which may, e.g., cause the client device 260 to display a graphical user interface similar to graphical user interface 405, which is displayed in FIG. 4). Additionally or alternatively, the second order processing engine 240 may cause the fourth amount of the second fiat currency or second cryptocurrency to be moved into an account for a user of the client device 260.

Although the above described event sequence primarily refers to the transfer of orders for a single trading pair from the first order processing engine 230 to the second order processing engine 240, this is for illustrative purposes only, and processing of any number of trading pairs may be distributed to any number of order processing engines without departing from the scope of the disclosure.

Figure 3:
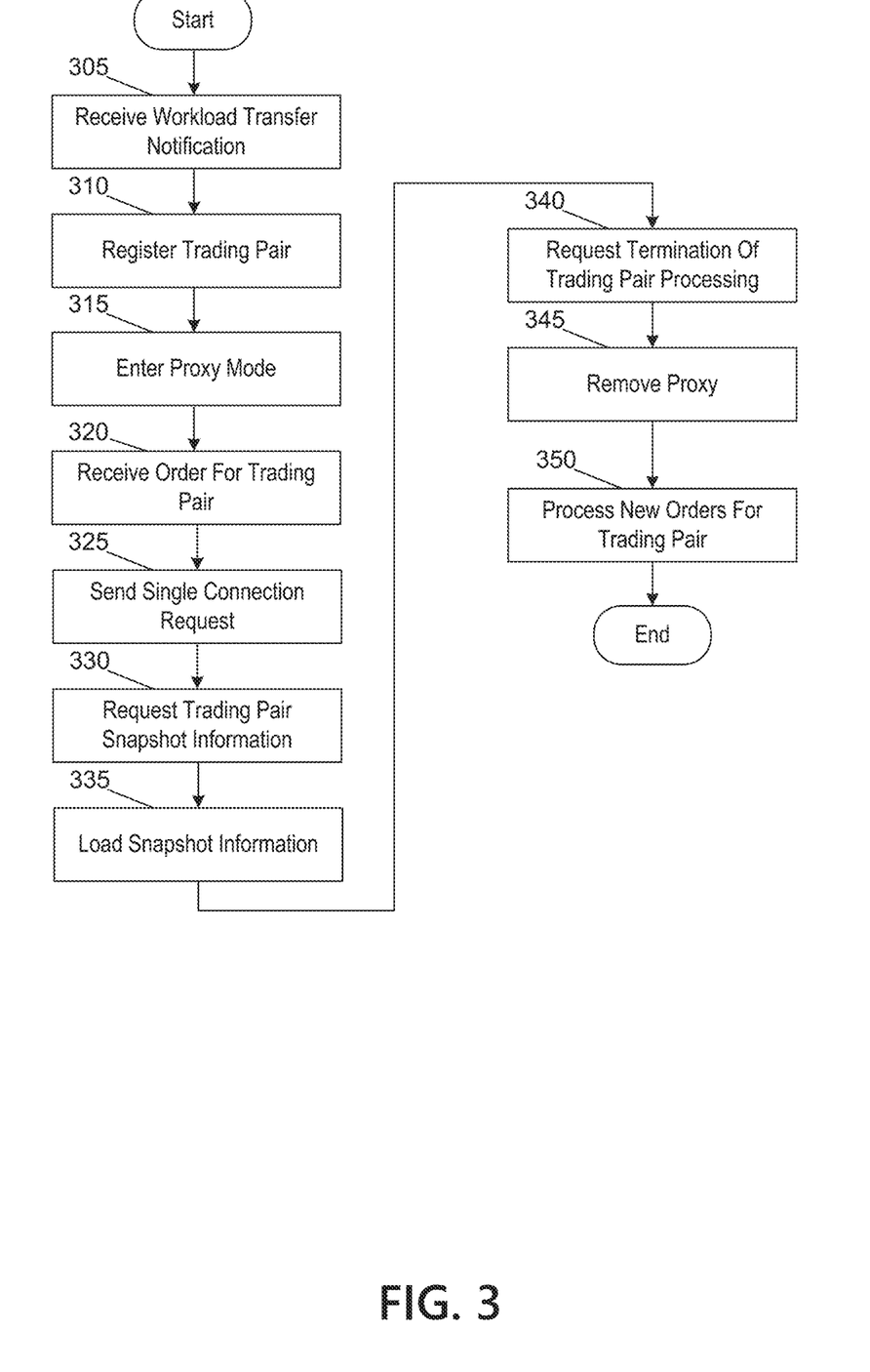
FIG. 3 depicts an illustrative method for engine sharding and migrating trading pairs to a destination computing platform from a source computing platform in accordance with one or more example embodiments.

FIG. 3 depicts an illustrative method for engine sharding and migrating trading pairs to a destination computing platform from a source computing platform in accordance with one or more example embodiments. For example, FIG. 3 depicts a summary flowchart indicating the actions performed by the second order processing engine 240, which are illustrated in FIGS. 2A-2E. Referring to FIG. 3, at step 305, a destination computing platform having at least one processor, a communication interface, and memory may receive a workload transfer notification, indicating the processing of trading orders for a trading pair should be migrated from a source computing platform to the destination computing platform. At step 310, the destination computing platform may register the trading pair, which may initiate a process of configuring the destination computing platform to execute trading orders for the trading pair. At step 315, the destination computing platform may enter a proxy mode, which may cause orders for the trading pair to be routed to the source computing platform through the destination computing platform. At step 320, the destination computing platform may receive an order for the trading pair. At step 325, the destination computing platform may send a single connection request to the source computing platform, which may configure the source computing platform to communicate exclusively with the destination computing platform. At step 330, the destination computing platform may request trading pair snapshot information, which may provide a state of the order book for the trading pair to the destination computing platform needed to execute trading requests for the trading pair. At step 335, the destination computing platform may load this trading pair snapshot information into memory for use in executing trading requests for the trading pair. At step 340, the destination computing platform may request that the source computing platform terminates processing of trading orders for the trading pair. At step 345, the destination computing platform may remove the proxy. At step 350, the destination computing platform may initiate processing of any new orders for the trading pair going forward.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for migrating trading pairs to a destination computing platform from a source computing platform, the method comprising:
   determining, by the destination computing platform and based on a processing load at the source computing platform and a processing load at the destination computing platform, that order processing for a subset of trading pairs of a plurality of trading pairs, comprising exchanges of a first cryptocurrency or fiat currency for a second cryptocurrency or fiat currency, should be migrated from the source computing platform to the destination computing platform, wherein orders for the subset of trading pairs of the plurality of trading pairs are currently routed to and processed by the source computing platform;
   based on the determining that the order processing of the subset of trading pairs of the plurality of trading pairs should be migrated from the source computing platform to the destination computing platform, configuring, by the destination computing platform, the destination computing platform to process a first trading pair;
   publishing, by the destination computing platform to an engine discovery computing device, an intent to become a proxy for the source computing platform;
   configuring, by the engine discovery computing device, the destination computing platform as the proxy for the source computing platform;
   entering, by the destination computing platform, a proxy mode, wherein the orders for the subset of trading pairs of the plurality of trading pairs are routed to the destination computing platform rather than the source computing platform based on the entering the proxy mode;
   notifying, by the engine discovery computing device, one or more client computing devices and an order entry gateway computing device that the destination computing platform is configured as the proxy for the source computing platform;
   routing, by the one or more client computing devices, the orders for the subset of trading pairs of the plurality of trading pairs to the order entry gateway computing device;
   routing, by the order entry gateway computing device, the orders for the subset of trading pairs of the plurality of trading pairs to the destination computing platform for processing;
   sending, by the destination computing platform and to the source computing platform, one or more electronic commands configured to cause the source computing platform to enter a single connection mode;
   entering, by the source computing platform, the single connection mode based on the one or more electronic commands, wherein entering the single connection mode limits communication of the source computing platform to communication with the destination computing platform, and causes other communication requests to be rejected;
   receiving, by the destination computing platform and from the source computing platform, order processing information corresponding to the subset of trading pairs of the plurality of trading pairs;
   loading, by the destination computing platform, the order processing information of the subset of trading pairs of the plurality of trading pairs into memory;
   directing, by the destination computing platform and after the order processing information of the subset of trading pairs of the plurality of trading pairs is loaded into the memory, the source computing platform to cease processing for the subset of trading pairs of the plurality of trading pairs;
   disabling, by the destination computing platform and after directing the source computing platform to cease processing for the subset of trading pairs of the plurality of trading pairs, the proxy mode for the source computing platform;
   receiving, by the destination computing platform and from the order entry gateway computing device, after the order processing information of the subset of trading pairs of the plurality of trading pairs is loaded into memory, and after the source computing platform has ceased processing for the subset of trading pairs of the plurality of trading pairs, and after disabling the proxy mode for the source computing platform, the orders for the subset of trading pairs of the plurality of trading pairs; and processing, by the destination computing platform, the received orders for the subset of trading pairs of the plurality of trading pairs based at least in part on the loaded order processing information.

2. The method of claim 1, wherein determining that the subset of the plurality of trading pairs should be migrated from the source computing platform to the destination computing platform further comprises receiving, by the destination computing platform from an order management system, an indication that the subset of the plurality of trading pairs should be migrated from the source computing platform to the destination computing platform.

3. The method of claim 1, wherein receiving the order processing information of the subset of the plurality of trading pairs from the source computing platform comprises receiving snapshot information for the subset of the plurality of trading pairs that enables the destination computing platform to process orders for the subset of the plurality of trading pairs, and wherein receiving the order processing information of the subset of the plurality of trading pairs from the source computing platform occurs after requesting, by the destination computing platform, the order processing information.

4. The method of claim 1, wherein the orders for the subset of the plurality of trading pairs are routed exclusively to the destination computing platform once the proxy mode for the source computing platform is disabled.

5. A system for migrating trading pairs to a destination computing platform from a source computing platform, the system comprising:
the source computing platform;
an engine discovery computing device;
one or more client computing devices;
an order entry gateway computing device; and
the destination computing platform comprising;
at least one processor;
a communication interface communicatively coupled to the at least one processor; and
memory storing computer-readable instructions that, when executed by the at least one processor, cause the destination computing platform to:
determine, based on a processing load at the source computing platform and a processing load at the destination computing platform, that order processing for a subset of trading pairs of a plurality of trading pairs, comprising exchanges of a first cryptocurrency or fiat currency for a second cryptocurrency or fiat currency, should be migrated from the source computing platform to the destination computing platform, wherein orders for the subset of trading pairs of the plurality of trading pairs are currently routed to and processed by the source computing platform;
based on the determining that the order processing of the subset of trading pairs of the plurality of trading pairs should be migrated from the source computing platform to the destination computing platform, configure the destination computing platform to process a first trading pair;
publish, to the engine discovery computing device, an intent to become a proxy for the source computing platform, wherein the engine discovery computing device is configured to configure the destination computing platform as the proxy for the source computing platform;
enter a proxy mode, wherein the orders for the subset of trading pairs of the plurality of trading pairs are routed to the destination computing platform rather than the source computing platform based on the entering the proxy mode, wherein
the engine discovery computing device is configured to notify the one or more client computing devices and the order entry gateway computing device that the destination computing platform is configured as the proxy for the source computing platform,
the one or more client computing devices are configured to route the orders for the subset of trading pairs of the plurality of trading pairs to the order entry gateway computing device, and
the order entry gateway computing device is configured to route the orders for the subset of trading pairs of the plurality of trading pairs to the destination computing platform for processing;
send, to the source computing platform, one or more electronic commands configured to cause the source computing platform to enter a single connection mode, wherein the source computing platform is configured to enter the single connection mode based on the one or more electronic commands, wherein entering the single connection mode limits communication of the source computing platform to communication with the destination computing platform, and causes other communication requests to be rejected;
receive, from the source computing platform, order processing information corresponding to the subset of trading pairs of the plurality of trading pairs;
load the order processing information of the subset of trading pairs of the plurality of trading pairs into memory;
direct, after the order processing information of the subset of trading pairs of the plurality of trading pairs is loaded into the memory, the source computing platform to cease processing for the subset of trading pairs of the plurality of trading pairs;
disable, after directing the source computing platform to cease processing for the subset of trading pairs of the plurality of trading pairs, the proxy mode for the source computing platform;
receive, from the order entry gateway computing device, after the order processing information of the subset of trading pairs of the plurality of trading pairs is loaded into memory, and after the source computing platform has ceased processing for the subset of trading pairs of the plurality of trading pairs, and after disabling the proxy mode for the source computing platform, the orders for the subset of trading pairs of the plurality of trading pairs; and
process the received orders for the subset of trading pairs of the plurality of trading pairs based at least in part on the loaded order processing information.

6. The system of claim 5, wherein determining that the subset of the plurality of trading pairs should be migrated from the source computing platform to the destination computing platform further comprises receiving, by the destination computing platform from an order management system, an indication that the subset of the plurality of trading pairs should be migrated from the source computing platform to the destination computing platform.

7. The system of claim 5, wherein receiving the order processing information of the subset of the plurality of trading pairs from the source computing platform comprises receiving snapshot information for the subset of the plurality of trading pairs that enables the destination computing platform to process orders for the subset of the plurality of trading pairs, and wherein receiving the order processing information of the subset of the plurality of trading pairs from the source computing platform occurs after requesting, by the destination computing platform, the order processing information.

8. The system of claim 5, wherein the orders for the subset of the plurality of trading pairs are routed exclusively to the destination computing platform once the proxy mode for the source computing platform is disabled.

\* \* \* \* \*